(12) United States Patent
Wang et al.

(10) Patent No.: US 8,873,845 B2
(45) Date of Patent: Oct. 28, 2014

(54) CONTEXTUAL DOMINANT COLOR NAME EXTRACTION

(75) Inventors: Jingdong Wang, Beijing (CN); Zhong Wu, Issaquah, WA (US); Xian-Sheng Hua, Bellevue, WA (US); Shipeng Li, Palo Alto, CA (US); Peng Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 100 days.

(21) Appl. No.: 13/569,333

(22) Filed: Aug. 8, 2012

(65) Prior Publication Data

US 2014/0044349 A1 Feb. 13, 2014

(51) Int. Cl.
*G06K 9/00* (2006.01)
*G06K 9/34* (2006.01)

(52) U.S. Cl.
USPC .......................................................... 382/165

(58) Field of Classification Search
USPC .......... 382/162, 164, 165, 167, 190, 224, 275
See application file for complete search history.

(56) References Cited

U.S. PATENT DOCUMENTS

| | | | | |
|---|---|---|---|---|
| 5,533,150 | A * | 7/1996 | Zulian | 382/275 |
| 6,449,389 | B1 * | 9/2002 | Schweid | 382/164 |
| 7,079,683 | B2 | 7/2006 | Kim | |
| 2008/0193016 | A1 * | 8/2008 | Lim et al. | 382/190 |
| 2008/0215548 | A1 | 9/2008 | Ohashi et al. | |
| 2010/0046842 | A1 | 2/2010 | Conwell | |
| 2010/0172584 | A1 * | 7/2010 | Lukac et al. | 382/167 |
| 2011/0150275 | A1 | 6/2011 | Tong et al. | |

OTHER PUBLICATIONS

Benavente et al., "A data set for fuzzy colour naming," Color Research and Application, vol. 31, No. 1, Feb. 2006, retrieved at <<http://www.cic.uab.cat/Public/Publications/2006/BVB2006/CRA2006_preprint_web.pdf>>, pp. 48-56, 14 pages.
Berlin et al., "Basic Color Terms: Their Universality and Evolution," University of California Press, Los Angeles, 1969, 108 pages.
Canny, "A computational approach to edge detection," IEEE Trans. Pattern Anal. Mach. Intell., vol. 8, No. 6, 1986, retrieved at <<http://perso.limsi.fr/Individu/vezien/PAPIERS_ACS/canny1986.pdf>>, pp. 679-698.
Chamorro-Mart'inez et al., "Retrieving images in fuzzy object-relational databases using dominant color descriptors," Fuzzy Sets and Systems, vol. 158, No. 3, 2007, retrieved at <<http://decsai.ugr.es/vip/files/journals/ChamorroEtAl_FSS07.pdf>>, pp. 312-324.

(Continued)

*Primary Examiner* — Amir Alavi
(74) *Attorney, Agent, or Firm* — Dan Choi; Judy Yee; Micky Minhas (57) ABSTRACT

Dominant color names may be extracted from an image by analyzing spatial-context of pixels contained in the image. A dominant color region may be defined by taking a double-threshold approach that addresses ambiguous color regions and a degree of confidence that each pixel belongs in the dominant color region. Affiliation maps and binary maps may be used to generate the dominant color region. Images may be converted to a saliency map, from which a region of interest may be assigned a dominant color name. Image search results may be filtered by the dominant color name associated with the image.

20 Claims, 6 Drawing Sheets

(56) References Cited

OTHER PUBLICATIONS

Chang et al., "Overview of the MPEG-7 standard," IEEE Trans. Circuits Syst. Video Techn., vol. 11, No. 6, 2001, retrieved at <<http://ieeexplore.ieee.org/stamp/stamp.jsp?tp=&arnumber=927421>>, pp. 688-695.

Conway, "An experimental comparison of three natural language colour naming models," in Proceedings of the EWHCI, 1992, retrieved at <<http://citeseerx.ist.psu.edu/viewdoc/download?doi=10.1.1.35.7068&rep=rep1&type=pdf>>, pp. 328-339, 12 pages.

Hardin et al., "Color Categories in Thought and Language," Cambridge University Press, 1997, retrieved at <<http://catdir.loc.gov/catdir/samples/cam034/96007898.pdf>>, (Part 1 of 4—90 pages).

Hardin et al., "Color Categories in Thought and Language," Cambridge University Press, 1997, retrieved at <<http://catdir.loc.gov/catdir/samples/cam034/96007898.pdf>>, (Part 2 of 4—98 pages).

Hardin et al., "Color Categories in Thought and Language," Cambridge University Press, 1997, retrieved at <<http://catdir.loc.gov/catdir/samples/cam034/96007898.pdf>>, (Part 3 of 4—100 pages).

Hardin et al., "Color Categories in Thought and Language," Cambridge University Press, 1997, retrieved at <<http://catdir.loc.gov/catdir/samples/cam034/96007898.pdf>>, (Part 4 of 4—123 pages).

Hofmann et al., "Probabilistic latent semantic indexing," in SIGIR, 1999, retrieved at <<https://www.mpi-sb.mpg.de/departments/d5/teaching/ss00/proseminar-papers/4/hofmann-sigir99.pdf>>, pp. 50-57.

Jiang et al., "Automatic salient object segmentation based on context and shape prior," in BMVC, 2011, retrieved at <<http://www.bmva.org/bmvc/2011/proceedings/paper110/paper110.pdf>>, 12 pages.

JSON/Atom Custom Search API, retrieved on Mar. 27, 2012 at <<http://code.google.com/apis/customsearch/v1/reference.html>>, 12 pages.

Kiranyaz et al., "Dominant color extraction based on dynamic clustering by multi-dimensional particle swarm optimization," Content-Based Multimedia Indexing, International Workshop on, vol. 0, 2009, retrieved at <<http://ieeexplore.ieee.org/stamp/stamp.jsp?arnumber=05137838>>, pp. 181-188.

Krishnan et al., "Content based image retrieval using dominant color identification based on foreground objects," International Conference on Computational Intelligence and Multimedia Applications, vol. 3, 2007, retrieved at <<http://ieeexplore.ieee.org/stamp/stamp.jsp?tp=&arnumber=4426366>>, pp. 190-194.

Kuan et al., "Color-Based Image Salient Region Segmentation using Novel Region Merging Strategy," Proceedings: IEEE Transactions on Multimedia, vol. 10, Issue 5, Aug. 2008 retrieved at <<http://robotics.csie.ncku.edu.tw/HCI_Project_2009/HCI_%E6%9E%97%E4%BB%81%E4%BF%8A.pdf>>, pp. 832-845.

Li et al., "Extracting image dominant color features based on region growing," in WISM, 2010, retrieved at <<http://ieeexplore.ieee.org/stamp/stamp/jsp?tp=&arnumber=5662813>>, pp. 120-123.

Liu et al., "A Survey of Content-based Image Retrieval with High-level Semantics," Proceedings: Pattern Recognition, vol. 40 Issue 1, Jan. 2007, retrieved at <<http://csce.uark.edu/~jgauch/library/Video-Retrieval/Liu.2006a.pdf>>, pp. 262-282.

Liu et al., "Learning to detect a salient object," in CVPR, 2007, IEEE Computer Society, retrieved at <<http://ieeexplore.ieee.org/stamp/jsp?tp=&arnumber=4270072>>, 8 pages.

Mojsilovic et al., "Extraction of Perceptually Important Colors and Similarity Measurement for Image Matching, Retrieval, and Analysis," IEEE Transactions on Image Processing, Nov. 2002, retrieved at <<http://ect.bell-labs.com/who/emina/papers/pfl.pdf>>, pp. 1238-1248.

More et al., "Multi-Relation Image Retrieval and Annotation Based on Holistic Approach and Decision Tree," Proceedings: International Journal of Computer Applications, vol. 39, No. 7, Feb. 2012, retrieved at <<http://research.ijcaonline.org/volume39/number7/pxc3877096.pdf>>, pp. 39-44.

Rao et al., "Article: CTDCIRS: Content based image retrieval system based on dominant color and texture features," IJCA, vol. 18, No. 6, 2011, retrieved at <<http://www.ijcaonline.org/volume18/number6/pxc3872961.pdf>>, pp. 40-46.

van deWeijer et al., "Learning color names for real-world applications," IEEE Transactions on Image Processing, vol. 18, No. 7, 2009, retrieved at <<http://ieeexplore.ieee.org/stamp/stamp.jsp?arnumber=04982667>>, pp. 1512-1523.

* cited by examiner

CONTEXTUAL DOMINANT COLOR NAME EXTRACTION

BACKGROUND

Color naming systems are designed to assign a color name to pixels in an image. Grouping pixels with the same color name defines a color region. The color region with the largest overall area often defines what humans perceive as an overall color of the image. However, the color region with the largest area may be in the background and therefore not be of interest to a human viewing the image. Typically, the overall color of the image is defined by a subject, or an object, contained in the image.

Determining the overall color of the image may be helpful in many applications. For example, images included as search results may be filtered by the overall color in the image. However, the overall color of the image may vary according to how the color regions are defined, and therefore may affect the filtering of image search results.

Existing color naming systems assign a color name to pixels in an image based on each pixel's color as it relates to a color model standard. As such, existing color naming systems assign the color name to a pixel, and group pixels of similar color, without taking into account the color name of a nearby pixel. In addition, existing color naming systems determine the color name of a pixel without considering whether or not the nearby pixel, even when a different color, relates to the same object in the image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

This disclosure describes example methods for contextual dominant color name extraction of an image which may be used, for example, for filtering image search results. Contextual dominant color name extraction may include a color name learning method, a dominant color region extraction method, and/or a method for extracting the dominant color name contained in a salient region of interest. By applying one or more of the example methods described herein, pixels in an image may be merged into a dominant color region based on a context between the pixels. Subsequently, a dominant color name may be assigned to the dominant color region.

In one embodiment, assigning a color name to a pixel includes analyzing neighboring pixels and assigning the color name to the pixel based at least in part on analyzing a context of the neighboring pixels. For example, the pixel may be compared to one or more neighboring pixels to determine a probability that the pixel belongs to a color name and a degree of resemblance between the pixel and the one or more neighboring pixels.

In another embodiment, pixels are assigned to a color region based on a strict threshold that determines a degree of confidence that the pixel belongs in the color region. A pixel that meets or exceeds the strict threshold defines the color region, whereas a pixel that does not meet the strict threshold defines an ambiguous region. In some examples, an area of the color region may be limited by a predetermined threshold, thereby reducing noisy areas within the color region (e.g., areas of pixels that do not assemble closely with each other).

In another embodiment, the ambiguous region derived by applying the strict threshold may be analyzed for context relative to the color region. For example, by applying the ambiguous regions of the image to a loose threshold, one or more pixels in the ambiguous region may be added to the color region to define a dominant color region. In this manner, pixels that may be contextually perceptible by a human are included in the dominant color region. In some implementations, a dominant color name is derived from the dominant color region.

In yet another embodiment, the dominant color name may be derived from a region of interest in a saliency map. Here, the saliency map may be generated by combining a pixel level contrast map and a region level contrast map of an input image. The region of interest in the saliency map defines a dominant region of the input image as perceived by a human. By assigning a dominant color name to the region of interest in the saliency map, dominant colors of the input image may be determined.

In one application, the dominant color name associated with the input image, as determined by the methods described herein, may be used to filter image search results.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As discussed above, conventional color naming systems are designed to assign a color name to pixels in an image based on each pixels color as it relates to a color model standard. That is, existing color naming systems assign the color name to a pixel without taking into account the color name or context of an adjacent pixel. In addition, existing color naming systems fail to assign the color name to a pixel by considering a relationship between the pixel and an object in the image. For example, existing color naming systems determine the color name of a pixel without considering whether or not the nearby pixel, even when a different color, relates to the same object in the image.

This disclosure describes example methods for contextual dominant color name extraction of an image. According to this disclosure, contextual dominant color name extraction may include a color name learning method, a dominant color region extraction method, and/or a method for extracting the dominant color name contained in a salient region of interest (e.g., localized region of interest).

In one embodiment, the color name learning method includes learning a probability distribution for manually labeled color names of RGB colors. In some implementations, a Gaussian Mixture Model (GMM) may be applied to the probability distribution. By learning the probability distribution for each color name, color regions (e.g., a region derived by merging pixels of a similar color name) are defined more consistent with human perception than by not learning the probability distribution.

Generally, contextual dominant color name extraction includes assigning a color name to a pixel in an image based, at least in part, on a relationship (e.g., a spatial-context) between the pixel and an object in the image and/or a context between the pixel and an adjacent pixel. For instance, context between pixels may be based, for example, on a double-threshold approach. That is, a strict threshold determines a degree of confidence that a color of a pixel belongs to a particular color name. After the pixel is labeled with a color name based on the strict threshold, a loose threshold is applied to neighboring pixels (e.g., those that surround the labeled pixel) to determine if any of the neighboring pixels share context (e.g., related to same object or share similar color) with the labeled pixel, and thus should be merged into a common region of interest (e.g., a dominant color region). After the common region of interest is determined, a dominant color name may be assigned to the common region of interest to represent an overall color for the image.

For instance, given an image depicting a red car, due to variances in image quality, lighting, or other reasons, some pixels of the red car may be a shade of red, pink, white, or other colors. However, all the pixels still belong to the same object, the red car. Thus, by applying one or more of the example methods described herein, the pixels that are shades of red, pink, white, or other colors may be included into the dominant color region based, not on color name alone, but also on a contextual relationship to the object. The dominant color region may be assigned a dominant color name 'red' although this region also includes pixels that, without contextual analysis, may be pink, white, or other colors.

In some embodiments, extracting a dominant color name for an image includes generating an affiliation map and/or a binary map. For example, the affiliation map may be generated for each color name associated with a plurality of pixels in the image. A strict threshold may be applied to the pixels in the affiliation map to ensure a high probability that the pixels belong to the color name. The one or more pixels that are greater than the strict threshold are selected to generate the binary map. In some implementations, color image dilation is applied to the binary map resulting in color regions of spatially close pixels. Additionally or alternatively, the color regions in the binary map may be filtered to limit an area of the color regions to a minimum percentage. By filtering the area of the color regions to greater than three percent of the whole image area, for example, noisy color regions may be reduced. After color image dilation and filtering are applied to the binary map, the color regions that remain may be referred to as propagation seeds, or color seeds. A color name may be extracted from each color of propagation seeds, at which time the propagations seeds are considered labeled. In some implementations, a dominant color name may be assigned to the image based on the color of the propagation seed the highest percentage of pixels relative to a total number of pixels in the image. In other implementations, the dominant color name may be selected for an image based at least in part on a value that represents each colors percentage of coverage in the image. Here, the value may be derived from a color region, an affiliation map, and/or a binary map.

In another embodiment, the propagation seeds may be further analyzed to generate a dominant color region through a process referred to as contextual propagation. Contextual propagation includes analyzing neighboring regions (e.g., regions that are adjacent to the propagation seeds) to determine which pixels from the neighboring regions share context with the propagation seeds. Those pixels from the neighboring regions that share context with the propagation seeds, as determined by contextual propagation, combine to generate the dominant color region. In some implementations, analysis through contextual propagation includes identifying unlabeled neighbor pixels that surround pixels labeled with a color name in the propagation seeds. For example, a pixel on an outer periphery of the color region may border one or more pixels outside the color region that are unlabeled. For each identified unlabeled neighbor pixel, contextual propagation may also use the generated affiliation map and comparing the affiliation map of the unlabeled neighbor pixel to a loose threshold. Here, the loose threshold is defined to be lower than the strict threshold and may be, for example, tuned using a validation set based at least in part on a labeled database (e.g., a database that includes labeled pixels). Unlabeled neighbor pixels that are equal to or lower than the loose threshold are identified as not having a contextual relationship to the color region. Unlabeled neighbor pixels that are greater than the loose threshold undergo an additional contextual propagation step to limit a maximum change of membership degree between the unlabeled neighbor pixels' membership degree to the color name. The techniques used for contextual propagation of an image will be covered in greater detail below.

Contextual dominant color name extraction may be employed by a multitude of applications. By way of example and not limitation, images may be selectively indexed according to dominant color name. Indexed images may be accessed, for example, by a search engine in order to return images following a search query. For instance, images which are not only relevant but also contain a dominant color specified by the search query may be promoted in search results based on the image being indexed with a dominant color name. At times, presenting search result images ranked by dominant image color may not always be desired. Thus, alternatively, search result images may be filtered to present images with a particular color name. For instance, a user may elect, after receiving search results, to filter the image search results by making a selection in a user interface or search engine window.

As described herein, an image may include a photograph, a painting, a drawing, clipart, a graph, a map, a chart, a frame of a video, or other still image. The image may be acquired by crawling web pages in all or part of the web domain or any other corpus of images that can be searched. While being described as being applicable to still images, the techniques described herein may also be applicable to video, animations, moving images, or the like.

The detailed discussion below begins with a section entitled "Illustrative Architecture," which describes in detail an example contextual dominant color name extraction architecture for implementing the techniques described herein. This section also describes an example flow of operations within the architecture as a user filters search images by dominant color name. A second section entitled "Illustrative Contextual Dominant Color Name Extraction Methods" follows.

This brief overview, including section titles and corresponding summaries, is provided for the reader's convenience and is not intended to limit the scope of the claims, nor the proceeding sections.

Illustrative Architecture

Figure 1:
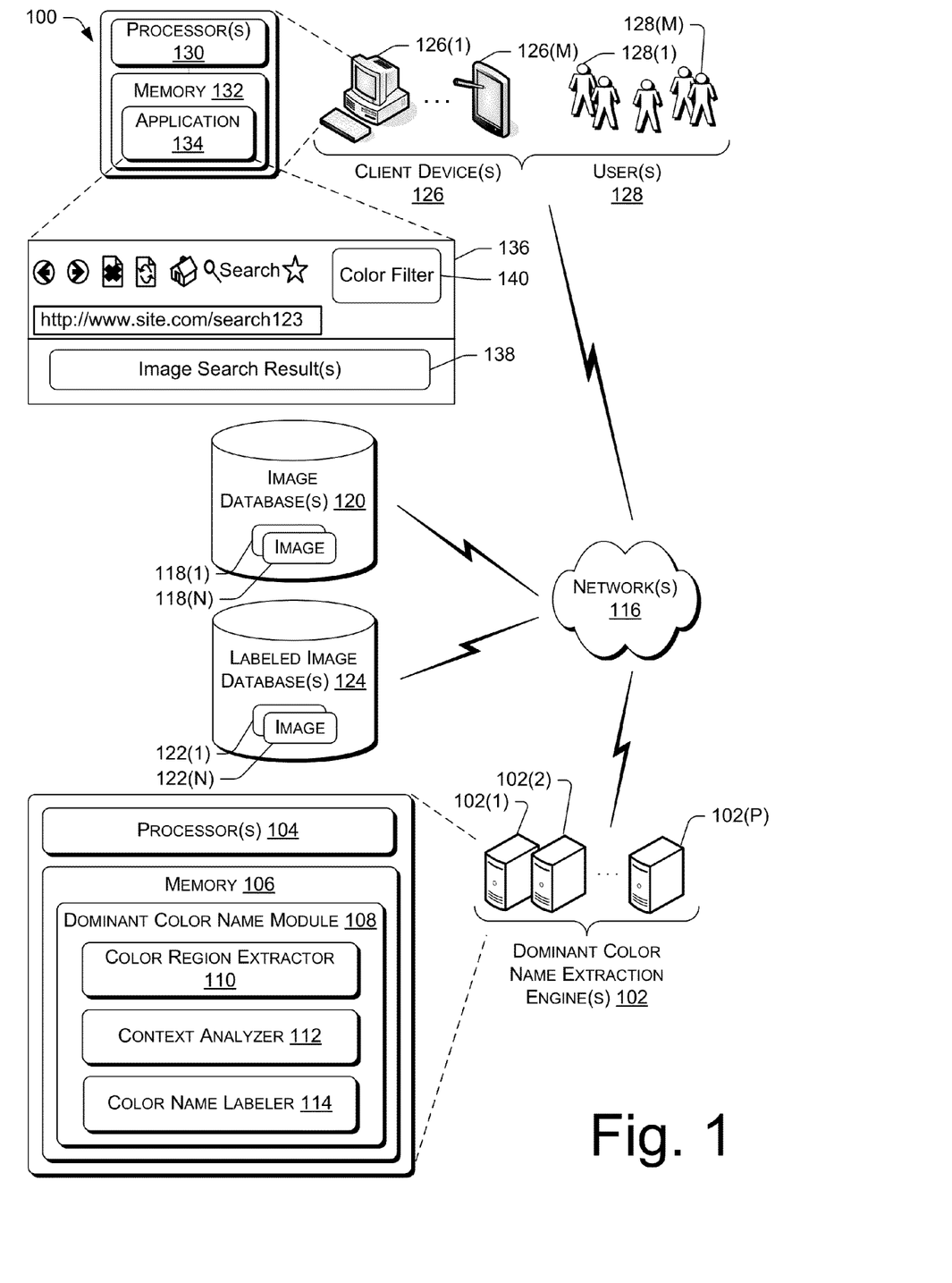
FIG. 1 is a schematic diagram of example architecture for extracting a dominant color name for an image.

FIG. 1 is a schematic diagram of an example computing architecture 100 that may implement the described techniques for extracting a dominant color name from an image and filtering image search results by the extracted dominant color name.

As illustrated, the architecture 100 includes a dominant color name extraction engine 102 to extract a dominant color name. The dominant color name extraction engine 102 includes one or more processors 104 and memory 106 which includes a dominant color name module 108. The one or more processors 104 and the memory 106 enable the dominant color name extraction engine 102 to perform the functionality described herein. In FIG. 1, the dominant color name module 108 includes a color region extractor 110, a context analyzer 112, and a color name labeler 114.

In one implementation, the dominant color name extraction engine 102 may receive or access, via a network 116, an image 118(1), ..., 118(N) (collectively 118) from an image database 120 and process the image 118 with the dominant color name module 108. For example, the color region extractor 110 may merge pixels in the image 118 into color regions. Meanwhile, the context analyzer 112 may analyze the image 118 for a contextual relationship among pixels. The color name labeler 114 may assign a color name to one or more pixels and/or one or more color regions in the image 118. Additionally or alternatively, the color name labeler 114 may label image 118 with a dominant color name. Details of the functions performed by the color region extractor 110, the context analyzer 112, and the color name labeler 114 are discussed in detail below with respect to FIG. 3.

In another implementation, the dominant color name extraction engine 102 may send or expose, via network 116, one or more labeled images 122(1), ..., 122(N) (collectively 122) to a labeled image database 124. In one embodiment, the labeled image 122 may be labeled with, for example, a dominant color name via metadata, or other association. In another embodiment, the labeled image may be labeled with a percentage that each color of pixels appears in the image. In this way, the dominant color name of an image processed by the dominant color name extraction engine 102 is available to various applications via network 116.

In another implementation, a web search engine (not shown), may employ the dominant color name extraction engine 102 in order to derive a dominant color name for an image. For example, while architecture 100 demonstrates an example in which the labeled image database 124 is available to provide an image with a labeled dominant color name, alternatively, the dominant color name extraction engine 102 may be integrated into the web search engine. In another example, the web search engine may be associated with an on-line retailer in order to return one or more products that include a dominant color name. Additionally or alternatively, dominant color name extraction may be incorporated in other applications. For instance, the dominant color name extraction engine 102 may be employed in an email platform (not shown). In that case, images contained in an inbox, or other email folder, may be filtered and/or ranked by dominant color name. Another implementation for the dominant color name extraction engine 102 may include a network, such as a social network or a photo sharing site. In this implementation, images being stored, received, or sent between users may be filtered and/or ranked by dominant color name and surfaced based on their dominant color name. Yet another implementation may include incorporating dominant color name extraction engine 102 into an image capture device (not shown). By incorporating the dominant color name extraction engine 102 into the image capture device, each of the multiple images may be filtered and/or ranked by dominant color name, giving the user a quick and accurate way to locate the image of a particular color from among the multiple images. For instance, the images may be organized on the image capture device based on dominant color name, may be downloaded from the image capture device based on their dominant color name, and/or may be organized or grouped in an image processing/viewing application of a computing device after receiving the images from the image capture device based on the dominant color name filtering or ranking.

While FIG. 1 illustrates the dominant color name extraction engine 102 as containing the illustrated modules and components, these modules and their corresponding functionality may be spread amongst multiple other actors, each of whom may or may not be related to the dominant color name extraction engine 102.

The network 116 facilitates communication between the dominant color name extraction engine 102, the image database 120, the labeled image database 124, and the client device 126. For example, the network 116 may be a wireless or a wired network, or a combination thereof. The network 116 may be a collection of individual networks interconnected with each other and functioning as a single large network (e.g., the Internet or an intranet). Examples of such networks include, but are not limited to, personal area networks (PANs), local area networks (LANs), wide area networks (WANs), and metropolitan area networks (MANs). Further, the individual networks may be wireless or wired networks, or a combination thereof.

In the illustrated example, the architecture 100 includes the client device 126. In some implementations, a user 128(1), ..., 128(M) (collectively 128) may interact with the architecture 100 via the client device 126. As illustrated, the client device 126 may be representative of many types of computing devices including, but not limited to, a mobile phone, a personal digital assistant, a smart phone, a handheld device, a personal computer, a notebook or portable computer, a netbook, an Internet appliance, a portable reading device, an electronic book reader device, a tablet or slate computer, a television, a set-top box, a game console, a media player, a digital music player, etc., or a combination thereof.

The upper-left portion of FIG. 1 illustrates information associated with the client device 126 in greater detail. As illustrated, the client device 126 includes one or more processors 130 and memory 132 which further includes an application 134. The one or more processors 130 and the memory 132 enable the client device 126 to perform the functionality described herein. The application 134 presents a user interface (UI) 136 which includes one or more image search results 138 and a color filter control 140. In one embodiment, the application 134 may receive a search query from user 128, and in response, access the labeled image database 124 via network 116. Here, the search request may include, for example, a semantic search query, or alternatively, a structured search query. In this embodiment, the application 134 may present image search results 138 based on the dominant color name associated with each image.

In another implementation, the user 128 may interact with the application 134 to filter the image search results 138 by the dominant color name associated with each image in the image search results 138. For instance, in response to the user 128 interacting with the color filter control 140, images associated with a particular color name selected by the user 128 may be promoted ahead of images with a dominant color name different from the particular color name selected by the user 128. For example, the user 128 may interact with the color filter control 140 to filter the image search results by one or more of: all colors, black and white, black, blue, brown, grey, green, orange, pink, purple, red, white, yellow, and/or teal. Interacting with the color filter control 140 may include selecting a button, a link, a drop down menu, or an icon. Alternatively, the color filter control 140 may be selected via a voice or a gesture. While the application 134 performs this functionality in this example, a browser, or another application of the client device 126 may facilitate accessing the labeled image database 124. Alternatively, some or all of the functionality related to dominant color name filtering of images may be performed by a remote server (e.g., as a web service).

Referring still to FIG. 1, the image database 120 may send the image 118 to the dominant color name extraction engine 102 via the network 116. By way of example, the image database 120 may acquire the image 118 by crawling web pages in part of, or in the entire web domain.

In the illustrated example, the labeled image database 124 may receive, from the dominant color name extraction engine 102, labeled images 122 that include a dominant color name. For example, the labeled image 122 may be received from the dominant color name extraction engine 102. Alternatively, the labeled image database 124 may send the labeled image 122 to the application 134 for inclusion in the image search results 138. For instance, the labeled image 122 may be sent, via the network 116, to the client device 126.

In total, the architecture 100 provides a dominant color name extraction system that is able to extract a dominant color name from an image and filter image search results by the extracted dominant color name. For instance, the architecture 100 may extract the dominant color name via dominant color name module 108 based on pixel context relative to another pixel, and store the labeled images 122 in the labeled image database 124. Storing the labeled images 122 in this manner may provide images labeled with a dominant color name to the application 134 for inclusion as image search results 138. Additionally, the user 128 may filter the image search results 138 by the dominant color name via the color filter control 140.

While illustrated as being implemented on a server or a server farm, in other embodiments the methods could be implemented using a distributed or cloud-based computing architecture.

In the illustrated implementation, the dominant color name extraction engine 102 is shown to include multiple modules and components. The illustrated modules may be stored in memory 106. The memory 106, as well as the memory 132, may include computer-readable media in the form of volatile memory, such as Random Access Memory (RAM) and/or non-volatile memory, such as read only memory (ROM) or flash RAM. The illustrated memories are an example of computer-readable media. Computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

While one example architecture 100 has been illustrated and described, multiple other architectures may implement the techniques described herein.

Figure 2:
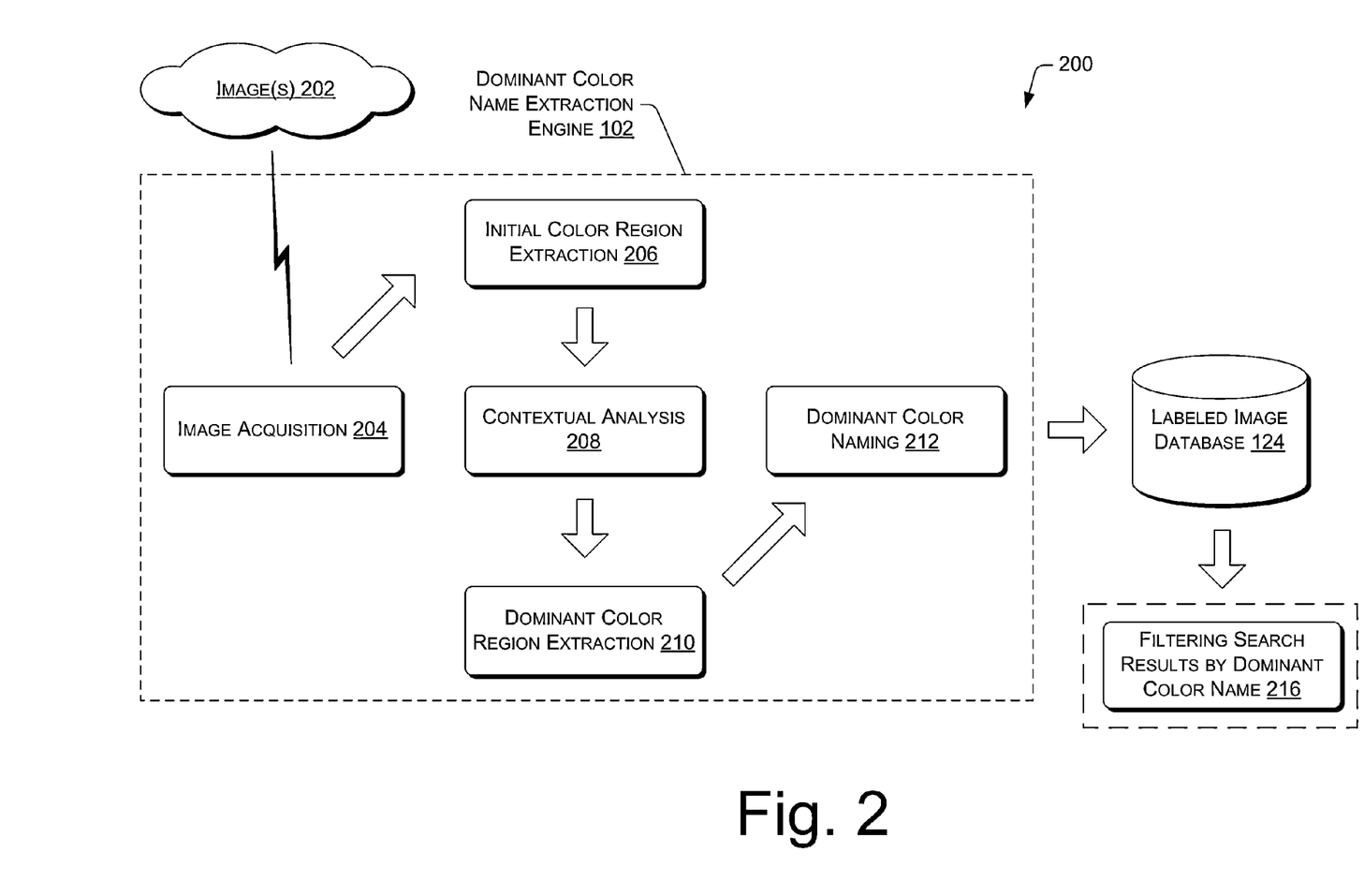
FIG. 2 is a schematic diagram that illustrates an example operation for extracting a dominant color name for an image by the architecture of FIG. 1.

FIG. 2 is a schematic diagram that illustrates an example operation 200 for extracting a dominant color name for an image by the architecture of FIG. 1. The example operation 200 illustrates (i) extracting a dominant color name for an image 202 through color region extraction and contextual analysis, and (ii) sending the image 202, along with an association with the extracted dominant color name, to the labeled image database 124.

In the example operation 200, the dominant color name extraction engine 102 receives an image 202 via image acquisition 204. For instance, an image crawler obtains one or more images 202 from one or more web pages of the World Wide Web. The image 202 may be acquired from any location, including the Web, a store, a database, or other memory.

The operation 200 continues with initial color region extraction 206. Here, initial color regions (e.g., areas of similar color) are extracted from the image 202. For example, pixels may be assigned a color name, and grouped into regions based at least in part on the assigned color name. In one embodiment, the initial color region may include an affiliation map (e.g., a map that includes areas grouped by color name). In some embodiments, the affiliation map may be generated for at least a portion of colors identified in the image 202.

Next, the image 202 is analyzed through contextual analysis 208. In the illustrated example, contextual analysis 208 is performed by the dominant color name module 108 that includes context analyzer 112. Contextual analysis 208 may include applying one or more thresholds to one or more pixels and/or one or more color regions to determine a relationship between pixels and/or color regions. Additionally or alternatively, contextual analysis may include applying color image dilation to a color region, affiliation map, and/or a binary map.

The operation 200 continues with the dominant color name extraction engine 102 performing dominant color region extraction 210. In one embodiment, dominant color region extraction 210 includes extracting a region of interest from the image 202. In some examples, the region of interest may be derived from a saliency map generated from the image 202. In other embodiments, dominant color region extraction 210 includes extracting a dominant color region from a binary map of the image. In this example, the binary map may be generated, based at least in part on the affiliation map and the contextual analysis 208. Next, dominant color naming 212 includes labeling the extracted dominant color region with a dominant color name. The labeling may be performed by, for example, the color name labeler 114. The dominant color name of the image 202 may be the color predominantly perceived by a human when viewing the image 202.

In the example operation 200, after dominant color naming 212, the image 202 appended with the dominant color name by conventional techniques is sent to the labeled image database 124. The labeled image database 124 may index the image 202 based on dominant color name. In one implementation, the labeled image database 124 may provide image search results ranked by the dominant color name. In another implementation, the labeled image database 124 may provide ranked images in response to receiving selection of the color filter control 140.

Figure 3:
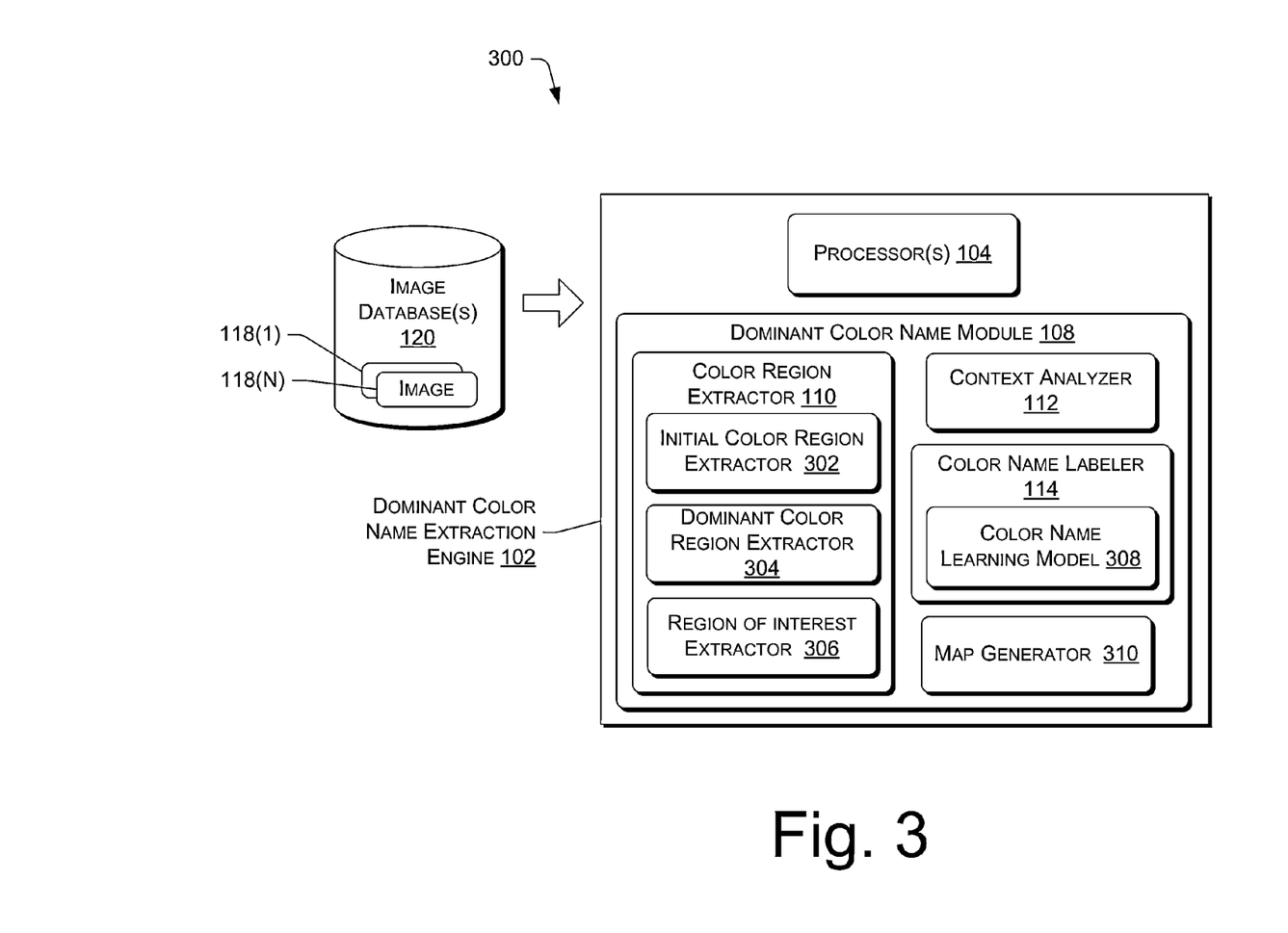
FIG. 3 is a schematic diagram that illustrates example modules of the architecture of FIG. 1 in greater detail.

FIG. 3 is a schematic diagram that illustrates example modules of the architecture of FIG. 1 in greater detail in greater detail. As described above, the dominant color name extraction engine 102 includes the dominant color name module 108, which further includes the color region extractor 110, the context analyzer 112 and the color name labeler 114.

The color region extractor 110 may merge pixels in the image 118 into color regions. For example, the color region extractor 110 may merge pixels into a color region based at least in part on the color name of a pixel. Additionally or alternatively, the color region extractor 110 may identify and/or merge color regions (e.g., initial color regions, dominant color regions, regions of interest, etc). In one embodiment, an initial color region (e.g., a color region available for further processing) may be extracted via an initial region extractor 302. In another embodiment, a dominant color region is extracted via a dominant color region extractor 304. For example, initial color regions may be merged together into a dominant color region. In another example, pixels outside a previously extracted color region may be added to the previously extracted color region to define the dominant color region.

In still another embodiment, the color region extractor 110 may extract a region of interest via a region of interest extractor 306. For example, the region of interest may be extracted from a saliency map (e.g., an image of extracted saliency features indicating a saliency of a corresponding region or point). In this example, the saliency map may be generated by combining a pixel level contrast map and a region level contrast map of an image. Here, the pixel level contrast map and the region level contrast map are generated using common techniques in the art. Combining the pixel level contrast map and the region level contrast map into one saliency map may be accomplished by the following equation.

$$SM(x) = (SM_{mc}(x) + \alpha SM_{cb}(x))^2 \qquad (1)$$

In this equation, $SM(x)$ is a saliency map for image x, $SM_{mc}$ is the pixel level contrast map, $SM_{cb}$ is the region level contrast map, and $\alpha$ is a balancing parameter. In some specific examples, the balancing parameter may be equal to 1 and the saliency map may be normalized. Additionally or alternatively, the balancing parameter may be tuned using a validation set from a salient object dataset such as that described by Liu et al., *Learning to Detect a Salient Object*, IEEE Transactions on Pattern Analysis and Machine Intelligence (PAMI), Vol. 33(2): 353-367, February 2011.

Given the saliency map for image x, the region of interest extractor 306 may extract the region of interest (ROI) in generally five steps. Here, the region of interest is represented by a bounding box with a top, bottom, left, and right edge position. First, the region of interest extractor 306 projects an x coordinate of the image onto the saliency map resulting in a projection profile. This step, and the remaining general steps are repeated for a y coordinate of the image. Second, the projection profile is smoothed by applying a Gaussian filter. This may be accomplished by the following equation.

$$P(x) = G_\sigma * (\Sigma_y SM(x)) \qquad (2)$$

In this equation, $P(x)$ is the projection profile for the x coordinate, $\sigma$ is a value associated with the Gaussian filter, and $SM(x)$ is a saliency map for image x. In some specific examples, $\sigma=5$. Third, a profile threshold (e.g., an adaptive threshold) is applied to the projection profiles (i.e., the x coordinate projection profile and the y coordinate projection profile) by, for example, the following equation.

$$P(x) \geq T_P, T_P = \beta \overline{P(x)} \qquad (3)$$

In this equation, $T_P$ is the profile threshold which is equal to $\beta \overline{P(x)}$ in which $\overline{P(x)}$ is the mean value of $P(x)$ and $\beta$ is a balancing value. In some specific examples, $\beta=0.7$. Generally, after applying the profile threshold according to equation 3, the projected profile for each coordinate includes one or more sections (e.g., one or more lines). Next, the longest section from among the one or more sections in the x coordinate projection profile is selected as the left and right bounding points of the region of interest. Meanwhile, the longest section from among the one or more sections in the y coordinate projection profile is selected as the top and bottom bounding points of the region of interest. By extracting the region of interest, a relationship between a pixel and an object in the image may be determined. For example, the pixels in the region of interest may be considered related to the object in the image.

Referring still to FIG. 3, the context analyzer 112 may analyze pixels in an image for a context (e.g., a relationship) relative to other pixels in the image. For example, the context analyzer may analyze spatially close pixels to determine a similarity among color names of the spatially close pixels. In another embodiment, the context analyzer 112 may apply a threshold to a color region or to a pixel. Additionally or alternatively, the context analyzer 112 may include a color image dilation algorithm. In yet another embodiment, the context analyzer 112 may limit an area of a color region on an affiliation map, a binary map, and/or a saliency map. For example, the area of the color region may be limited to a minimum percentage relative to the total image area. Alternatively, in some embodiments, the area of the color region must be greater than a predetermined threshold.

Referring still to FIG. 3, the color name labeler 114 may assign a color name to one or more pixels and/or color regions in an image. Additionally or alternatively, the color name labeler 114 may label the image with a dominant color name. The color name may include, for example, black, blue, brown, grey, green, orange, pink, purple, red, white, yellow, and/or teal. By employing the color name labeler 114, the color name may be associated with, assigned, or applied to images. In one implementation, a dominant color name of a non-labeled image is determined by applying the color name labeler 114 to the non-labeled image. For example, the color name labeler 114 may select a label to one or more images 118 from the image database 120.

The color name labeler 114 may also include a color name learning model 308. The color name learning model 308 creates a learned distribution of a set of colors within an image. The set of colors name include, for example, black, blue, brown, grey, green, orange, pink, purple, red, white, yellow, and teal. For example, the image 118 from the image database 120 may be processed by the color name learning model 308. Processing the image 118 may include, for example, obtaining a plurality of color chips, assigning a label to a subset of the plurality of color chips, estimating a posterior probability distribution for each assigned label, and learning the color name based at least in part on the estimated posterior probability distribution. For example, the posterior probability distribution may be used to estimate a probability of a color belonging to a given color name. The plurality of color chips may be assigned a label by a human, a computer, or a combination of human and computer, and may be implemented using any conventional labeling methods. In one specific example, the posterior probability distribution may be derived from the following equation.

$$P(CN_i \mid c) = \frac{P(c \mid CN_i) P(CN_i)}{\sum_{i=1}^{K} P(c \mid CN_i) P(CN_i)} \quad (4)$$

In the above equation, c is a labeled RGB color of a pixel, $CN_i$ is a color name of the pixel, and K equals a number of color names in an image.

Referring still to FIG. 3, the dominant color name module 108 includes a map generator 310. For example, the map generator 310 may, given an input image, generate an affiliation map, a binary map, and/or a saliency map.

Illustrative Contextual Dominant Color Name Extraction Methods

Methods 400, 500, and 600 illustrate example methods of contextual dominant color name extraction, which may but need not be implemented in the context of the architecture 100 of FIG. 1 and/or using the components and features of FIGS. 2-3. Methods 400, 500, and 600 may additionally or alternatively be performed using different architectures and features. Moreover, the architectures of FIG. 1 and the features of FIGS. 2-3 may be used to implement additional or alternative methods.

Figure 4:
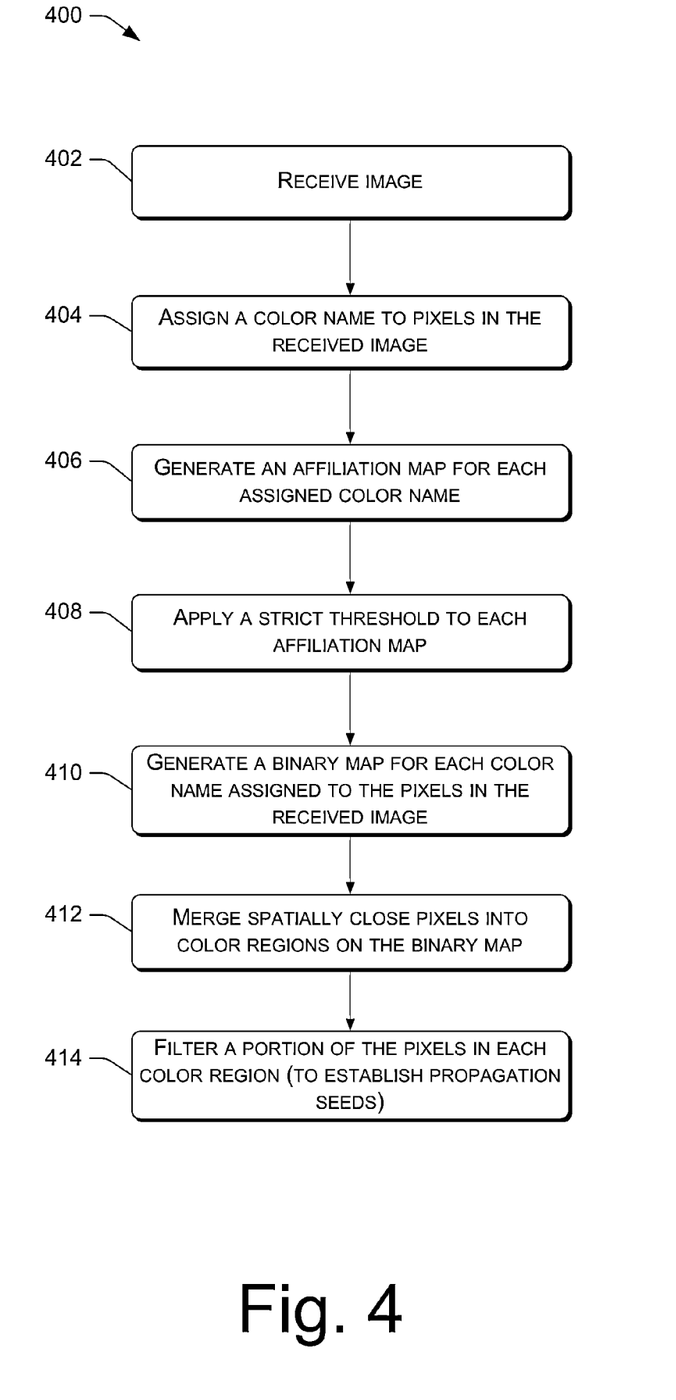
FIG. 4 is a flow diagram showing an example method for generating propagation seeds used in context-aware dominant color region extraction.

FIG. 4 is a flow diagram an example method 400 for generating propagation seeds used in context-aware dominant color region extraction. The method 400 includes, at operation 402, receiving an image. That is, the image may be received from an image database accessible by a network or stored on a device. Alternatively, the image may be received from memory in an image capturing device.

At 404, the method 400 continues by assigning a color name to one or more pixels in the received image. For example, the color name labeler 114 assigns the color name to a pixel based at least in part on a color contained in the pixel. At operation 406 an affiliation map is generated for each assigned color name. For instance, the map generator 308 stored in the dominant color name module 108 may generate the affiliation map based at least in part on the assigned color name. Meanwhile, at operation 408, a strict threshold is applied to each affiliation map. For example, the strict threshold is applied to each pixel in the affiliation map to determine a degree of confidence that the pixel belongs in the affiliation map. The strict threshold may be applied, in one example, via the context analyzer 112 in the dominant color name extraction engine 102.

At 410, the method 400 continues with generating a binary map for each color name assigned to the pixels in the received image. Here, each binary map includes one or more color regions representative of a particular color name. For instance, the map generator 310 stored in the dominant color name module 108 generates the binary map based at least in part on each pixel that meets or exceeds the strict threshold applied to the affiliation map.

Next, at 412 pixels spatially close to the color region on the binary map are merged into the color region based on color image dilating techniques common in the art. After merging spatially close pixels into the color region on the binary map, the resulting color region includes pixels that may be referred to as propagation seeds or color seeds. Alternatively, the color region that includes merged pixels as a result of color image dilation may also be referred to as propagation seeds or color seeds.

The method 400 concludes at 414 by filtering color regions that do not meet a relative threshold. For example, a color region with an area that is less than three percent of the total image area will be eliminated from the binary map.

Figure 5:
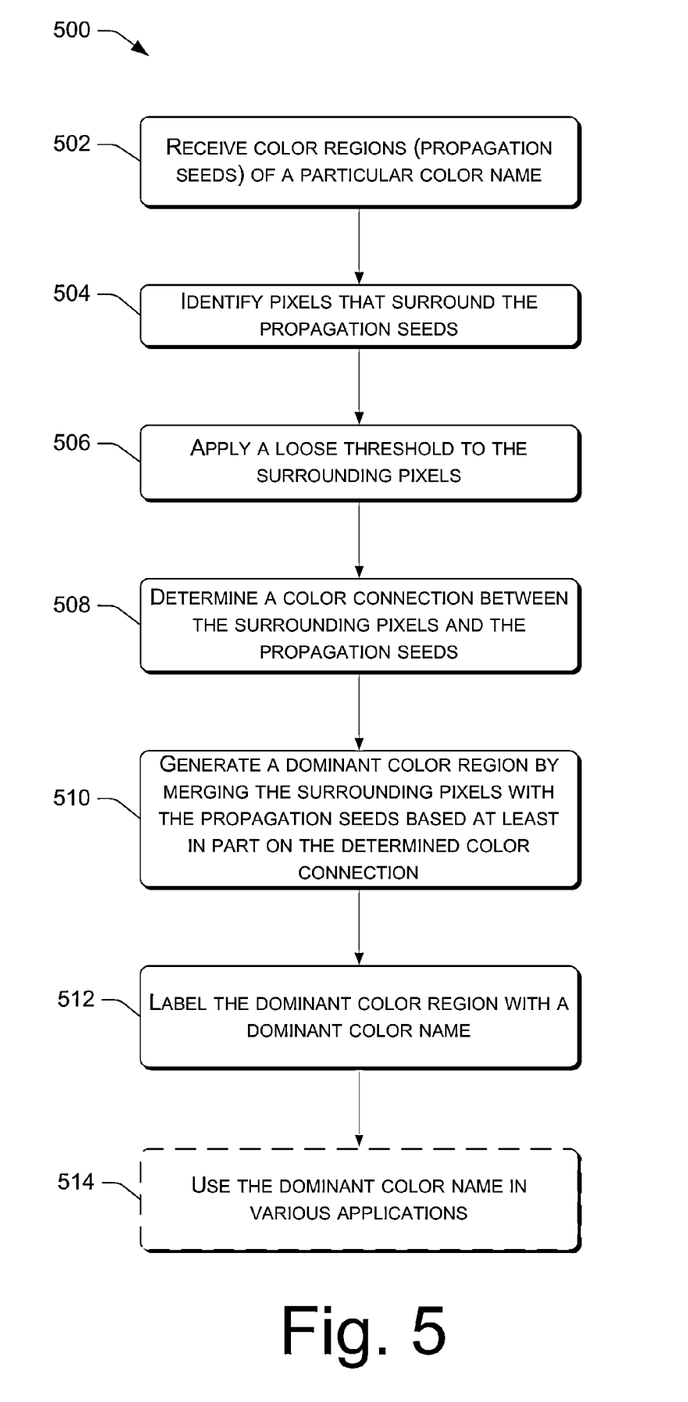
FIG. 5 is a flow diagram showing an example method for context-aware dominant color region extraction.

FIG. 5 is a flow diagram showing an example method 500 for context-aware dominant color region extraction.

The method 500 includes, at operation 502, receiving color regions of a particular color. The color regions include pixels of substantially similar color. In one embodiment, the received color regions may be in the form of an affiliation map or a binary map. In another embodiment, the received color regions may be propagation seeds as generated according to FIG. 4 above. For example, the color regions may be received by the dominant color name extraction engine 102.

At 504, the method 500 continues with identifying pixels that surround the color regions. For example, pixels that are adjacent to the pixels that are included in the color regions may be identified by context analyzer 112. The identified pixels may also be referred to as neighboring pixels or surrounding pixels and may or may not be in direct contact with pixels on the periphery of a color region.

Next, at operation 506, a loose threshold is applied to the surrounding pixels. In one embodiment, the surrounding pixels that are greater than the loose threshold (e.g., a set percentage for example) undergo an additional operation to determine whether or not to include the surrounding pixels in the color region. The surrounding pixels that are less than the loose threshold do not undergo additional operations. For example, the context analyzer 112 may apply the loose threshold to determine that the surrounding pixel contains a color sufficiently close to the color region to warrant additional operations.

When the color of the surrounding pixel is greater than the loose threshold, at operation 508, a color connection between the surrounding pixel and the color region is determined. For example, the context analyzer 112 compares the color of each surrounding pixel with a color of the pixel in the color region that it surrounds. In some specific examples, comparing the color may comprise comparing a value associated with the affiliation map of each surrounding pixel with a value associated with the affiliation map of the pixel in the color region that it surrounds. If the degree of change between the compared color names is within a pre-determined threshold, then the surrounding pixel is labeled with the same color name as the pixel in the color region.

Method 500 continues at operation 510 with generating a dominant color region by merging the surrounding pixels with the color region based at least in part on the determined color connection. For example, the color region extractor 110 may generate the dominant color region that may include pixels adjacent to the received color region.

In some implementations, operations 504-510 may be repeated for additional adjacent and/or surrounding pixels. For example, operations 504-510 may be applied to any number of adjacent and/or surrounding pixels such that all possible pixels are considered that may be added into the color region.

At operation 512, the dominant color region is labeled with a dominant color name. The dominant color name may be, for example, selected by the color name labeler 114. Optionally, at operation 514, the dominant color name may be used in various applications. For example, image search results may be filtered by the dominant color name.

Figure 6:
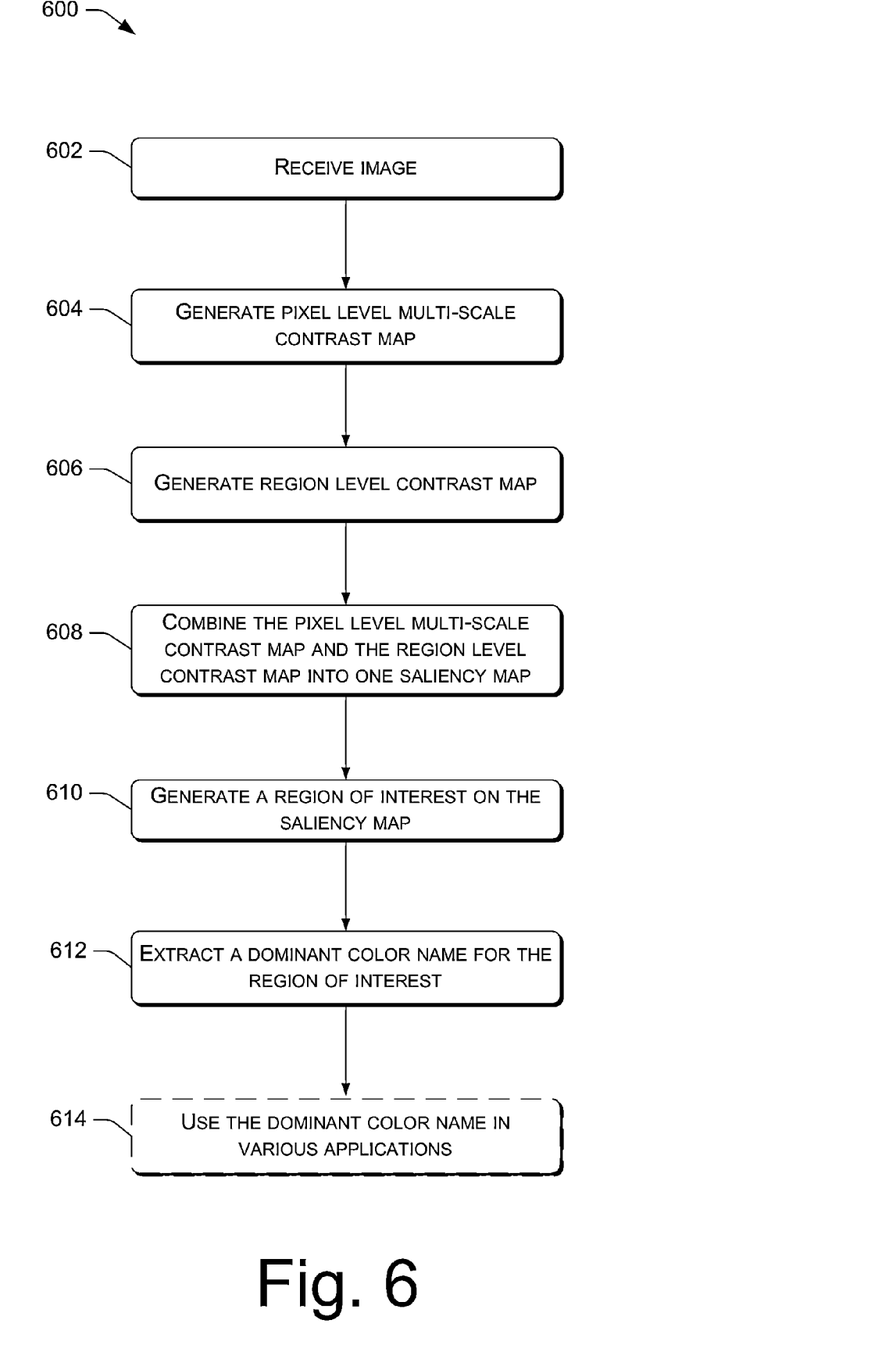
FIG. 6 is a flow diagram showing an example method for determining a dominant color name for a region of interest in a saliency map.

FIG. 6 is a flow diagram showing an example method 600 for determining a dominant color name for a region of interest in a saliency map. The method 600 begins, at operation 602, by receiving an image. For example, the image may be received by the dominant color name extraction engine 102.

At operation 604, a pixel level multi-scale contrast map is generated. Meanwhile, at operation 606, a region level contrast map is generated. The pixel level multi-scale contrast map and the region level contrast map may be generated by the map generator 310 using conventional techniques common in the art.

Method 600 continues at operation 608 by combining the pixel level multi-scale contrast map and the region level contrast map into one saliency map. For instance, the saliency map may be generated by the map generator 310.

Next, at operation 610 a region of interest is generated on the saliency map. For example, a bonding box is generated by the region of interest extractor 306. The region of interest yields the area of the received image that includes perceptually dominant colors.

At operation 612, a dominant color name is extracted for the region of interest. For example, the dominant color name extraction engine 102 may extract the dominant color name from among the perceptually dominant colors in the region of interest. Additionally, the dominant color name extraction engine 102 may also extract the dominant color name in the image background (e.g., an area not included in the region of interest). In one embodiment, each color in the region or interest is assigned a value that pertains to each color's percentage of coverage in the region of interest. In this embodiment, the color with the highest value (e.g., the highest percentage of coverage) will be assigned the dominant color name, by for example, the color name labeler 114.

Optionally, at operation 614, the dominant color name may be used in various applications. For example, image search results may be filtered by the dominant color name.

Methods 400, 500, and 600 are illustrated as a collection of blocks in a logical flow graph representing a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract. The order in which the methods are described is not intended to be construed as a limitation, and any number of the described method blocks can be combined in any order and/or in parallel to implement the method. Moreover, in some embodiments, one or more blocks of the method may be omitted from the methods without departing from the spirit and scope of the subject matter described herein.

CONCLUSION

Although the subject matter has been described in language specific to structural features and/or methodological acts, it is to be understood that the subject matter defined in the appended claims is not necessarily limited to the specific features, components, or acts described. Rather, the specific features, components, and acts are disclosed as illustrative forms of implementing the claims. For example, the methodological acts need not be performed in the order or combinations described herein, and may be performed in any combination of one or more acts. Additionally, the features, acts, and/or components may be rearranged, combined in different manners, and/or omitted entirely without departing from the spirit and scope of the subject matter described herein.

What is claimed is:

1. A method comprising:
under control of one or more processors configured with executable instructions:
determining a dominant color name of an image by:
receiving an image, the image including a plurality of pixels;
assigning a color name to a portion of the plurality of pixels;
generating an affiliation map for each assigned color name;
generating a binary map for each assigned color name based at least in part on the generated affiliation map;
determining a value for each assigned color name in each of the generated binary maps, the value indicating a portion of each assigned color name relative to a total of the assigned colors in the image; and
selecting the dominant color name for the image based at least in part on the determined value for each color represented in the binary map.

2. The method of claim 1, further comprising:
selecting a set of color seeds in each affiliation map, wherein the set of color seeds includes a region of at least one of the plurality of pixels and the selecting is based at least in part by:
determining that each color seed in the set of color seeds exceeds a predetermined threshold; and
generating a dominant color region based at least in part on the selected set of color seeds.

3. The method of claim 2, wherein selecting the set of color seeds is further based at least in part on:
merging spatially close color seeds through color image dilating; and
filtering an area of the merged spatially close color seeds.

4. The method of claim 2, wherein generating the dominant color region comprises:
applying a loose threshold to the filtered area of the merged spatially close color seeds.

5. The method of claim 2, wherein determining the value for each assigned color name in each of the generated binary maps is based on the selected set of color seeds.

6. The method of claim 1, further comprising:
comparing a color of a pixel to a color of one or more adjacent pixels; and
wherein selecting the dominant color name is based at least in part on the comparing.

7. The method of claim 1, wherein the color name is determined based at least in part on a learning model, the learning model comprising:
obtaining a plurality of color chips;
assigning a label to a subset of the plurality of color chips, wherein the label comprises at least one color name;
estimating a posterior probability distribution for each assigned label; and
learning the color name based at least in part on the estimated posterior probability distribution.

8. The method of claim 7, wherein:
the label is assigned by one or more humans; and
the estimating is based at least in part on a Gaussian mixture model.

9. The method of claim 1, further comprising filtering a set of search result images based at least in part on the dominant color name.

10. A system, comprising:
one or more processors; and memory, communicatively coupled to the one or more processors, storing a component configured to:
- extract a color region for each color name in a received image, the color region including one or more pixels that share a substantially similar color name;
- apply a strict threshold to each pixel in the color region, wherein the strict threshold determines a level of confidence that the pixel belongs to the color region;
- apply a loose threshold to each of one or more adjacent pixels, wherein the one or more adjacent pixels surround at least one pixel in the color region and the one or more adjacent pixels are not included in the extracted color region;
- add each of the one or more adjacent pixels that is greater than the loose threshold to the color region, thereby defining a dominant color region;
- select a dominant color name for the image based at least in part on the dominant color region.

11. The system of claim 10, the component further configured to limit a total area of the color region following application of the strict threshold.

12. The system of claim 10, wherein each of the one or more adjacent pixels that is greater than the loose threshold is added to the color region based at least in part on determining a degree of separation between a color of each of the one or more adjacent pixels and a color of the pixel included in the extracted color region.

13. One or more computer-readable storage devices, storing instructions that, when executed by one or more processors, configure the one or more processors to perform acts comprising:
- determining a dominant color name of an image by:
  - receiving an image;
  - computing a saliency map for the image based at least in part on a learned distribution of a set of colors within the image;
  - determining a localized region of interest based at least in part on the saliency map; and
  - assigning a dominant color name to the localized region of interest.

14. The one or more computer-readable storage devices of claim 13, further comprising filtering search results based at least in part on the assigned dominant color name.

15. The one or more computer-readable storage devices of claim 13, wherein determining the localized region of interest comprises:
- projecting an x coordinate and a y coordinate of the received image onto the saliency map resulting in an x coordinate projection profile and a y coordinate projection profile, respectively;
- applying an adaptive threshold to the x coordinate projection profile and the y coordinate projection profile;
- determining a left value and a right value of the localized region of interest based at least in part on the x coordinate projection profile; and
- determining a top value and a bottom value of the localized region of interest based at least in part on the y coordinate projection profile.

16. The one or more computer-readable storage devices of claim 13, further comprising:
- receiving a search query;
- generating a list of results based on the search query;
- saving the list of results;
- receiving an input from a user to filter the results based on image color; and
- filtering the list of results based on the assigned dominant color name of the image.

17. The one or more computer-readable storage devices of claim 13, wherein the learned distribution of a set of colors is determined by:
- obtaining human labeled color chips; and
- estimating a probability of a color belonging to a given color name based at least in part on the obtained human labeled color chips.

18. The one or more computer-readable storage devices of claim 17, wherein the human labeled color chips include twelve color names.

19. The one or more computer-readable storage devices of claim 18, wherein the twelve colors include black, blue, brown, grey, green, orange, pink, purple, red, white, yellow, and teal.

20. The one or more computer-readable storage devices of claim 13, wherein the saliency map is computed by combining a pixel level contrast map and a region level contrast map.

* * * * *